United States Patent [19]  [11] 4,409,185
Krause et al.  [45] Oct. 11, 1983

[54] SAFETY DEVICE FOR PACKAGINGS WHICH CONTAIN HYDROGEN EMITTING PYROPHORIC METALLIC CATALYSTS

[75] Inventors: Helmfried Krause, Rodenbach; Hubertus Wobbermin, Frankfurt, both of Fed. Rep. of Germany; Edgar Geigle, deceased, late of Alzenau, Fed. Rep. of Germany, by Brigitte Geigle, legal representative

[73] Assignee: Degussa Aktiengesellschaft, Frankfurt, Germany

[21] Appl. No.: 311,140

[22] Filed: Oct. 14, 1981

[30] Foreign Application Priority Data

Oct. 20, 1980 [DE] Fed. Rep. of Germany ....... 3039528

[51] Int. Cl.³ ............................................. G05B 9/00
[52] U.S. Cl. .................................... 422/113; 422/117; 422/120; 422/177; 206/5.1; 206/439

[58] Field of Search ............... 422/113, 117, 120, 123, 422/177; 206/5.1, 439

[56] References Cited

U.S. PATENT DOCUMENTS 3,288,578  11/1966  Witt ................................ 422/117 X
4,013,410   3/1977  Thomas et al. ..................... 422/30
4,119,706  10/1978  Rogers ............................ 422/177 X
4,289,855   9/1981  Whitley .......................... 422/117 X Primary Examiner—Ferris H. Lander
Attorney, Agent, or Firm—Beveridge, DeGrandi & Kline

[57] ABSTRACT

The object of the invention is a safety device for packagings which contain pyrophoric metallic catalysts that emit hydrogen. The apparatus consists of a hollow stopper, open upward, in the bottom of which a pressure relief valve is fitted, an oxidation catalyst arranged in the stopper, and a gas-permeable closure covering the upper side of the stopper.

11 Claims, 1 Drawing Figure

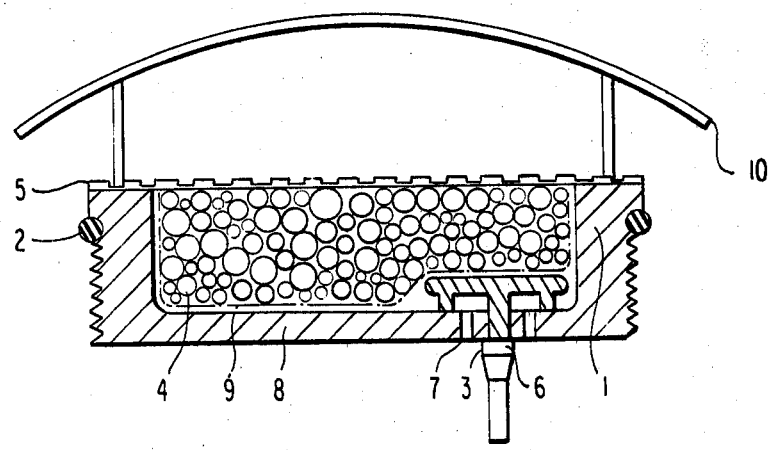

SAFETY DEVICE FOR PACKAGINGS WHICH CONTAIN HYDROGEN EMITTING PYROPHORIC METALLIC CATALYSTS

The invention relates to a safety device for packagings which contain hydrogen emitting pyrophoric metallic catalysts.

Storage and shipping of pyrophoric metallic catalysts suspended in water, such as Raney nickel or iron, require the use of packages designed to permit/escape of the hydrogen which is continuously developed as a result of after-reaction of residual aluminum contained in the catalyst with the suspension medium, in order to prevent a dangerous rise of pressure in the package. In general, one-way valves are generally provided for this purpose at a suitable location for fitting.

However, a special problem exists when large numbers of such packages are to be stored or transported in containers or other closed spaces, since according to experience the escaping hydrogen does not diffuse out in a sufficient amount through imperfect seals, but builds up to explosive concentrations. The lower ignition limit for an $H_2$/air mixture is 4 vol. % hydrogen, the ignition temperature 560° C. Hence there is always the possibility of build-up of an explosive gas mixture, particularly during transportation of drums protected against excess pressure and containing pyrophoric metallic catalysts, in closed containers, such as e.g., sea transportation containers.

The object of the invention is hence a safety device for packagings which contain pyrophoric metallic catalysts emitting hydrogen, and which consists of a hollow stopper, open upward, in particular a screw stopper provided with a seal, in the bottom of which stopper is provided a valve system for relief of excess pressure, and which is characterized in that the cavity of the stopper is filled with a catalyst for recombination of hydrogen with oxygen from the air and is closed by a gas-permeable covering connected to the upper wall of the stopper.

The valve system of the safety device can consist of a mushroom-shaped valve insert of elastic material, the stem of which is passed through a bore opening in the bottom of the stopper and has, beneath the bottom of the stopper, a thickening constructed as a stop which builds up stress, and the cap of which covers at least one gas passage opening on the upper side of the stopper bottom, the distance between the thickening and the cap shoulder being somewhat smaller than the thickness of the stopper bottom.

Such valves are known per se, as is likewise their fitting in a hollow, upward-open screw stopper fitted into the cover of a drum. However, it has been found that just such a valve system is particularly suitable for the safety device according to the invention.

In a further advantageous embodiment of the invention at least the upper side of the stopper bottom, and still better the whole inner wall of the screw stopper beneath the catalyst filling, is covered with a gas-permeable heat-protective foil. A perforated aluminum foil has been found to be particularly suitable for this. This foil allows the hydrogen emerging from the valve into the catalyst bed located above, and protects the bottom of the screw stopper from the heat which develops with temperatures of up to over 150° C., usually in bursts in dependence on the periodic opening of the pressure relief valve.

This heat protection is of particular importance when the stopper, corresponding to a preferred variant of the invention, consists of thermoplastic material, and its upper covering consists of metallic sieve fabric which is welded into the upper stopper edge.

To protect the stopper covering against rainwater or splashed water during transportation of the package in the open, the covering can be protected with a hood which is fitted above it with conventional fasteners or fastening means such that at least a small air gap remains.

Basically, any system can be utilized as catalyst which effects the reaction of hydrogen with oxygen from the air at usual environmental temperatures. In the present case, insertion of the catalyst as shaped bulk material (pellets) has been found to be suitable, but a powdered mass or a monolithic catalyst can also be provided.

Within the scope of the invention, catalysts consisting of a gamma-aluminum oxide carrier and a platinum group metal component, in particular of palladium and/or platinum, have been found to be advantageous, where the gamma aluminum oxide should have a specific surface of 50–400, preferably 80–350, in particular about 250 m$^2$/g.

The safety device and its operation will be further explained below with reference to an embodiment suitable for practice, in connection with the attached drawing and an example of an embodiment with a comparison example.

FIG. 1 is a sectional view of a stopper of the invention.

The safety device shown consists of a commercially available stopper body 1 with valve system 3, the catalyst filling 4, the cover 5, the heat insulating foil 9 and the protective hood 10.

The stopper body 1 of thermoplastic material is constructed as a screw stopper. The seal 2 serves for gas-tight engagement of the stopper into the cover of a steel drum.

The conventional valve system 3 is combined with the stopper 1 and has the following construction: The stem of the mushroom-shaped, elastic valve insert 6 is passed through a bore opening in the stopper bottom 8. A thickening of the stem beneath the stopper bottom 8 holds the valve insert fast under slight stress, so that the cap edge abuts the upper side of the stopper bottom 8 and covers the gas passage opening 7. The heat insulating foil 9, a perforated aluminum foil, covers the entire internal wall of the hollow stopper. The cavity enclosed within the insulating foil is filled with about 10 ml of catalyst beads 4. The upper side of the stopper 1 is covered with a wire netting, which is welded into the upper stopper edge. The protective hood 10 is provided when needed, i.e., when rain or splashed water is to be expected, and is welded at a spacing, fixed to the stopper edge.

The packaged pyrophoric metallic catalyst, e.g., Raney nickel, continuously develops small amounts of hydrogen. From an amount of 50 kg of catalyst suspended in the same amount of water, about 300 ml of $H_2$ are liberated per hour. As soon as an excess pressure of about 500 mm of water has built up in the sheet steel container closed gastightly by a tension ring cover and provided with the safety device as described, the mushroom valve opens and allows the hydrogen to escape. This flows through the heat insulating foil and the catalyst bed and is there catalytically reacted with entering oxygen from the air to form water according to:

$$H_2 + \tfrac{1}{2}O_2 \rightarrow H_2O$$

In this way, during transportation of the packaged pyrophoric metallic catalyst in a closed container or during storage in a closed space, accumulation is prevented of so much hydrogen as, in a mixture with air, will reach or exceed the lower explosion limit of 4 vol. % $H_2$. The safety device as described thus serves for transportation or storage without danger of metallic catalysts emitting hydrogen, in particular Raney-type catalysts, but can also find application for other substances which behave similarly.

Example 1 (Catalyst Shipping Without Safety Device)

193 steel drums closed with covers, each of 60 l capacity and respectively with 50 kg Raney nickel catalyst suspended in $H_2O$ (weight ratio catalyst:$H_2O$=about 1:1) were stowed in a 40 foot container. The closure cover of each container was here only equipped with a stopper body with mushroom valve system. The hydrogen concentration in the container was followed by continuous measurements. It rose continuously and reached 3 vol. % $H_2$ after 5 days, corresponding to 75% of the lower ignition limit (LIL), and 3.2 vol. % (80% LIL) after 6 days. The container could only be released for shipping after it was ensured that the doors were opened regularly every 2 days in order to allow the hydrogen formed to escape.

Example 2 (Catalyst Shipping With Safety Device)

Under the same experimental conditions as in Example 1, but with the difference that each catalyst container was provided with the safety device according to the invention (catalyst used: highly-dispersed metallic palladium, deposited on $\gamma$-$Al_2O_3$ of 250 $m^2/g$ specific surface (BET)), 0.9 vol. % $H_2$ (22.5% LIL) was measured after 5 days, which also remained unchanged after 6 days. It could thus be shown that the safety device not only operated effectively, but also held the $H_2$ concentration to such a low value that the closed container could be shipped safely without further safety measures.

Further variations and modifications of the invention will be apparent to those skilled in the art upon reading the foregoing and such variations and modifications are intended to be encompassed by the claims appended hereto.

We claim:

1. A safety device for packagings which contain hydrogen emitting pyrophoric metallic catalysts, comprising a hollow, upwardly open stopper (1) containing a cavity provided with sealing means (2) in the bottom (8) of which is arranged valve means (3) for pressure relief, comprising
   a mushroom-shaped valve insert of elastic material (6), having a stem and a cap, the stem of which is passed through a bore opening in the stopper bottom (8) and has, beneath the stopper bottom, a thickening constructed as a stop which builds up stress, and the cap of which covers at least one gas throughflow opening (7) at the upper side of the stopper bottom, the distance between the thickening and the cap shoulder being somewhat smaller than the thickness of the stopper bottom,
wherein said cavity of the stopper is filled with a catalyst (4) for recombination of hydrogen and oxygen from the air and is closed by a gas-permeable cover (5) connected to the upper edge of the stopper.

2. A safety device as defined in claim 1, wherein said stopper is a screw threaded stopper.

3. A safety device according to claims 1 or 2, wherein at least the upper side of the stopper bottom (8) is covered with gas-permeable heat-protective foil (9).

4. A safety device according to claims 1 or 2, wherein the stopper (1) consists of thermoplastic material and its cover (5) consists of metallic sieve fabric which is welded into the upper edge of the stopper.

5. A safety device according to claims 1 or 2, wherein the stopper covering is surrounded at a spacing by a hood (10), as a protection against rainwater or splashed water.

6. A safety device according to claims 1 or 2, wherein the catalyst consists of shaped bulk material.

7. A safety device according to claims 1 or 2, wherein the catalyst comprised gamma-alumina carrier having applied thereto a platinum group metal component.

8. A safety device according to claims 1 or 2, wherein the catalyst comprises of a gamma-alumina carrier having applied thereto palladium and/or platinum.

9. A safety device according to claims 1 or 2, wherein the catalyst comprises a gamma-alumina carrier with a specific surface of 50–400 $m^2/g$.

10. A safety device according to claims 1 or 2, wherein the catalyst comprises a gamma-alumina carrier having a specific surface of 80–350 $m^2/g$.

11. A safety device according to claims 1 or 2, wherein the catalyst comprises a gamma-alumina carrier having a specific surface of about 250 $m^2/g$.

* * * * *